United States Patent
San Martin et al.

(10) Patent No.: US 10,577,922 B2
(45) Date of Patent: Mar. 3, 2020

(54) EFFICIENT LOCATION OF CABLE BEHIND A DOWNHOLE TUBULAR

(71) Applicant: Halliburton Energy Services, Inc., Houston, TX (US)

(72) Inventors: Luis San Martin, Houston, TX (US); Burkay Donderici, Houston, TX (US); Aixa Maria River-Rios, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 188 days.

(21) Appl. No.: 15/558,071

(22) PCT Filed: Sep. 27, 2016

(86) PCT No.: PCT/US2016/053891
§ 371 (c)(1),
(2) Date: Sep. 13, 2017

(87) PCT Pub. No.: WO2018/063146
PCT Pub. Date: Apr. 5, 2018

(65) Prior Publication Data
US 2019/0055837 A1  Feb. 21, 2019

(51) Int. Cl.
*E21B 47/09* (2012.01)
*G01V 3/28* (2006.01)
(Continued)

(52) U.S. Cl.
CPC .......... *E21B 47/0905* (2013.01); *E21B 47/01* (2013.01); *G01V 3/28* (2013.01); *G01V 3/30* (2013.01); *G01V 3/38* (2013.01)

(58) Field of Classification Search
CPC ........ E21B 47/0905; G01V 3/30; G01V 3/28; G01V 3/38
See application file for complete search history.

(56) References Cited

U.S. PATENT DOCUMENTS 5,654,639 A * 8/1997 Locatelli .................. G01V 3/28
324/239
6,378,607 B1 4/2002 Ryan et al.
(Continued)

OTHER PUBLICATIONS

Arbuzov et al., "Memory Magnetic Imaging Defectoscopy," *SPE Russian Oil and Gas Exploration and Production Technical Conference and Exhibition*, Oct. 16-18, 2012, Moscow, Russia. SPE 162054.
(Continued)

*Primary Examiner* — Blake E Michener
(74) *Attorney, Agent, or Firm* — Haynes and Boone, LLP (57) ABSTRACT

Interrogation tools and methods are used to efficiently locate cable behind casing. The interrogation tool has at least one electromagnetic transmitter and receiver. An electromagnetic field is emitted from inside the tubular, whereby it interacts with the tubular and cable to produce a secondary electromagnetic field. The secondary electromagnetic field is measured by the receiver(s) from at least two different positions inside the tubular to produce corresponding response signals. The interrogation tool then compares the response signals to baseline response signals, whereby the position of the cable is determined. The electromagnetic measurements can be acquired simultaneously or sequentially.

23 Claims, 8 Drawing Sheets

(51) Int. Cl.
  *E21B 47/01* (2012.01)
  *G01V 3/30* (2006.01)
  *G01V 3/38* (2006.01)

(56) References Cited

U.S. PATENT DOCUMENTS

| | | | |
|---|---|---|---|
| 8,439,114 B2 | 5/2013 | Parrott et al. | |
| 2002/0093431 A1* | 7/2002 | Zierolf | E21B 17/006 340/854.1 |
| 2004/0238167 A1 | 12/2004 | Pinto et al. | |
| 2009/0195244 A1 | 8/2009 | Mouget et al. | |
| 2013/0105224 A1* | 5/2013 | Donderici | G01V 3/30 175/45 |
| 2013/0311094 A1* | 11/2013 | Donderici | G01V 3/28 702/7 |
| 2013/0329522 A1 | 12/2013 | Skinner et al. | |
| 2014/0208843 A1 | 7/2014 | Godfrey | |
| 2015/0032376 A1* | 1/2015 | Hou | G01V 3/26 702/7 |
| 2015/0177412 A1* | 6/2015 | San Martin | G01V 3/38 702/7 |
| 2016/0084983 A1* | 3/2016 | Wu | G01V 3/108 702/7 |
| 2016/0282504 A1* | 9/2016 | Wilson | E21B 47/0006 |
| 2018/0066511 A1* | 3/2018 | Ostermann | E21B 47/0905 |

OTHER PUBLICATIONS

Garcia et al, "Successful Application of a New Electromagnetic Corrosion Tool for Well Integrity Evaluation in Old Wells Completed With Reduced Diameter Tubular," International Petroleum Technology Conference, Mar. 26-28, 2013, Beijing, China. IPTC 16997.

International Search Report and the Written Opinion of the International Search Authority, or the Declaration, dated Jun. 26, 2017, PCT/US2016/053891, 12 pages, ISA/KR.

* cited by examiner

EFFICIENT LOCATION OF CABLE BEHIND A DOWNHOLE TUBULAR

PRIORITY

The present application is a U.S. National Stage patent application of International Patent Application No. PCT/US2016/053891, filed on Sep. 27, 2016, the benefit of which is claimed and the disclosure of which is incorporated herein by reference in its entirety.

FIELD OF THE DISCLOSURE

The present disclosure relates generally to locating cable behind a downhole tubular and, more specifically, to such a method using an optimal number of receivers.

BACKGROUND

In oil and gas exploration, the problem of locating a cable behind casing requires careful consideration. In new oil and gas well development, in many cases, a fiber optic cable is placed behind the casing for sensing or communication purposes. At the same time, however, the cable has to be protected from the damaging effects of perforation charges. Normally, the perforation would be placed at a convenient angular location to minimize the possibility of damaging the fiber cable.

To make the cable more detectable, it is normally surrounded or attached to ferromagnetic steel that can be detected by eddy currents which are induced in the metal when a solenoid transmitter passes nearby. The location of the cable can then be determined by detecting the induced eddy currents. The angular position of the cable is then determined at every depth along the casing. Once the cable angular position is determined, the orientation of the perforations can be chosen to minimize the risk of damage to the cable.

The problem with the conventional detection approach is the time required to locate the cable. The conventional approach requires stationary measurement at a number of angles, at every depth, in order to find the cable position. This is time consuming, thus greatly increasing completion time and cost.

DESCRIPTION OF ILLUSTRATIVE EMBODIMENTS

Illustrative embodiments and related methods of the present disclosure are described below as they might be employed in methods to locate cable behind a tubular using an optimal number of receivers. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative methods of the present disclosure are directed to determining the position of cable located behind a downhole tubular. Methods and related embodiments of the present disclosure can make as little as one sampling at each desired depth to determine the angular position of the cable. Thus, methods of the present disclosure greatly reduce the time required to locate the cable when compared to conventional approaches that require sampling at every angle at each depth.

In a generalized method of the present disclosure, an interrogation tool is deployed downhole within a tubular having a cable positioned outside the tubular. The interrogation tool has at least one electromagnetic transmitter and receiver. An electromagnetic field is emitted from a position inside the tubular, whereby it interacts with the tubular and cable (e.g., metal disturbance due to presence of cable) to produce a secondary electromagnetic field. The secondary electromagnetic field is measured by the receiver(s) from at least two different positions inside the tubular to produce corresponding response signals. The interrogation tool then compares the response signals to baseline response signals, whereby the position of the cable is determined. In certain methods, the two electromagnetic measurements can be acquired simultaneously (i.e., a single sampling) at each desired depth. Accordingly, as will be described in more detail below, the illustrative methods of the present disclosure provide very efficient location of cable behind the casing.

Illustrative embodiments and methods of the present disclosure employ eddy current inspection of cables. Thus, as described below, two different approaches can be used. The first is the time domain ("TD") approach in which the transmitter emits a pulse and the receivers register the decay. The second is the frequency domain ("FD") approach in which the transmitter operates in continuous wave mode. In the FD approach, the transmitter and receivers must be separated by a certain distance. The illustrative interrogation tools described in this disclosure can be FD or TD type, and are illustrative in nature, as the design and implementation of a specific transmitter-receiver unit would be different depending on the approach and use.

Figure 1:
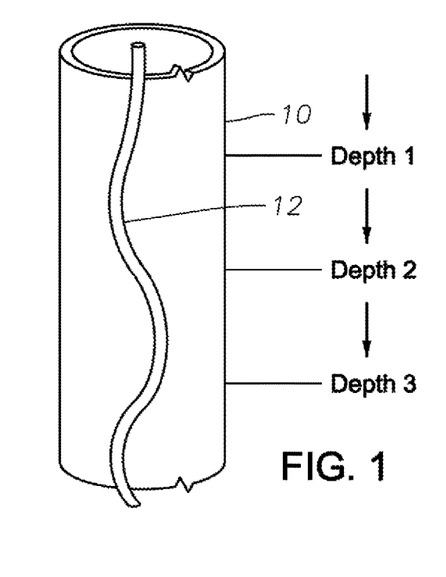
FIG. 1 illustrates a tubular having a cable located outside, and is useful to illustrate the principles of the present disclosure.

FIG. 1 illustrates a tubular having a cable located outside, and is useful to illustrate the principles of the present disclosure. Tubular 10 may be any form of downhole tubular including, for example, casing, production tubing, etc. A cable 12 is positioned outside tubular 10 (e.g., located behind casing). Cable 12 may be surrounded or otherwise attached to the tubular 10, which can be detected when eddy currents are induced therein, as will be described below. As shown in FIG. 1, the angular position of cable 12 around tubular 10 is different at depth 1, depth 2, and depth 3. Although the angular position of cable 12 is illustrated as being substantially vertical along tubular 10, in other applications the cable may be wrapped around tubular 10 in a spiral-like fashion. Therefore, it is of upmost importance the correct angular position of the cable be determined at every depth. If tubular 10 serves as casing, once the cable is located, perforation operations may begin.

Figure 2:
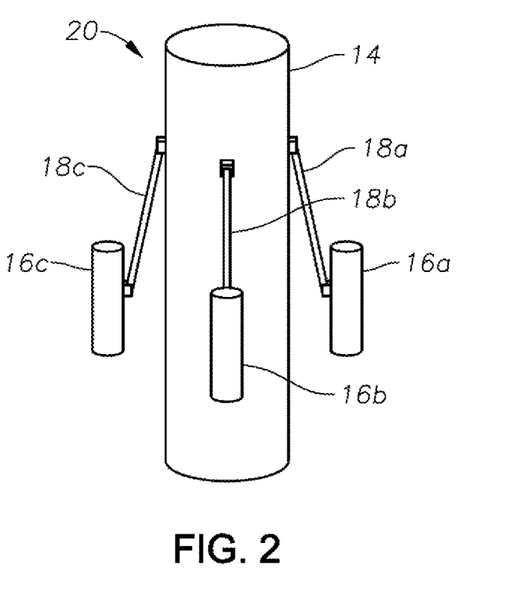
FIG. 2 illustrates an interrogation tool having three transmitter-receiver units positioned there-around, according to certain illustrative embodiments of the present disclosure.

FIG. 2 illustrates an interrogation tool having three transmitter-receiver units positioned there-around, according to certain illustrative embodiments of the present disclosure. In FIG. 2, interrogation tool 20 includes a body 14 made of, for example, metal or fiberglass. Interrogation tool 20 includes three extendable arms 18a, 18b and 18c that support three electromagnetic transmitter-receiver units 16a, 16b and 16c. Extendable arms 18a-c provide optimal operation in tubulars of various diameters because they minimize the pad stand-off with respect to the wall of the tubular 10. Each transmitter-receiver unit 16a-c houses a transmitter and receiver employing various configurations, as described herein. In this illustrative embodiment, each transmitter-receiver unit 16a-c is separated from the other by an angle of 120 degrees. Note, however, in alternate embodiments, there could be more than three transmitter-receiver units; in such cases, the transmitter-receiver units would be separated by angles of 360/N, where N is the number of transmitter-receiver units.

During operation of this illustrative embodiment, each transmitter in transmitter-receiver units 16a-c may operate in the TD sequentially or in the FD simultaneously. In the latter case, the transmitters can use different frequency sets. As a result, a single sampling can be conducted at each desired depth (which would obtain three different secondary electromagnetic field measurements). In the former case, however, three samplings would need to be acquired to obtain the three secondary electromagnetic field measurements. Nevertheless, in comparison to sequentially sampling each angular position around the tubular (as done in conventional approaches), the embodiments herein are very time efficient. In FD, frequencies in the range of 0.1 to 10 KHz may be used. In TD, rectangular or arbitrary pulses that are 0.1 to 10000 ms long may be used.

Figure 3:
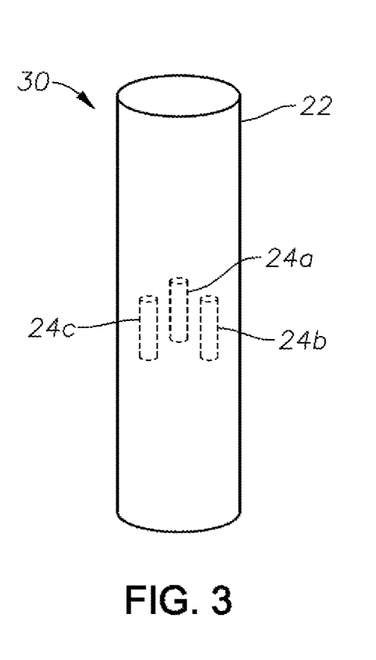
FIG. 3 illustrates an interrogation tool having three transmitter-receiver units positioned therein, according to certain illustrative embodiments of the present disclosure.

FIG. 3 illustrates an interrogation tool having three transmitter-receiver units positioned therein, according to certain illustrative embodiments of the present disclosure. Interrogation tool 30 again includes a body 20 similar to body 14 of interrogation tool 20. In this embodiment, however, interrogation tool 30 includes three stationary transmitter-receiver units 24a, 24b, and 24c positioned inside body 20. Transmitter-receiver units 24a-c also each include an electromagnetic transmitter and receiver, and each transmitter-receiver unit 24a-c is separated from the other by 120 degrees. In this example, there could also be more than three transmitter-receiver units as previously described.

The configuration of the transmitter-receiver units may vary in the illustrative embodiments described herein. For example, in certain embodiments, the use of three transmitter-receiver units are used to unambiguously determine the position of the cable outside the tubular at each depth. In certain other embodiments, however, two transmitter-receiver units may be used if one knows a priori the side of the tubular the cable is on. In other words, if the tubular were split into two 180 degree sides, one would need to know which side the cable was located on. With this prior knowledge, the unique location of the cable can be determined using only two transmitter-receiver units or acquiring only two measurements of the secondary electromagnetic field (using only a single transmitter-receiver unit).

In yet another alternative embodiment, the interrogation tools 20 or 30 may be altered to instead include a single transmitter. Here, the single transmitter would be at the center of body 14,22 and the three receivers would be located inside or around bodies 14,22. With reference to FIGS. 2 and 3, in this alternative embodiments, the transmitter-receiver units would only house receivers, and the single transmitter would be located inside body 14,22. However, note that the sensitivity to the location of the cable increases when the transmitter is at different locations, as described in relation to interrogation tools 20 and 30.

Figure 4:
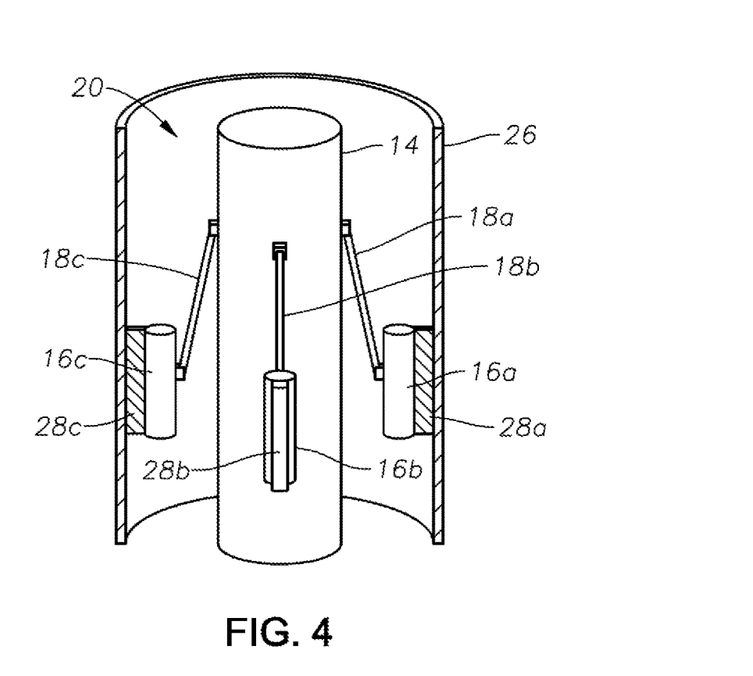
FIG. 4 shows interrogation tool of the present disclosure positioned inside a tubular.

FIG. 4 shows interrogation tool 20 of the present disclosure positioned inside a tubular. Although not shown, tubular 26 has a cable along its outer surface. Interrogation tool 20 includes features already described in relation to FIG. 2, however, with the addition of spacers 28a, 28b and 28c. As previously described, moveable transmitter-receiver units 16a-c are mounted on arms 18a-c, respectively, which extend to accommodate for optimal operation in tubulars of various diameters. In cases where the tubular diameter is large compared with the size of transmitter-receiver units 16a-c, a distance between transmitter-receiver units 16a-c and tubular 26 can be created using non-magnetic spacers 28a-c. This would provide a better distribution of the magnetic field of each sensor over the entire perimeter of tubular 26. In FIG. 4, transmitter-receiver units 16a-c are removed from tubular 26 by a distance determined by the standoff provided by spacers 28a-c.

Figure 5A:
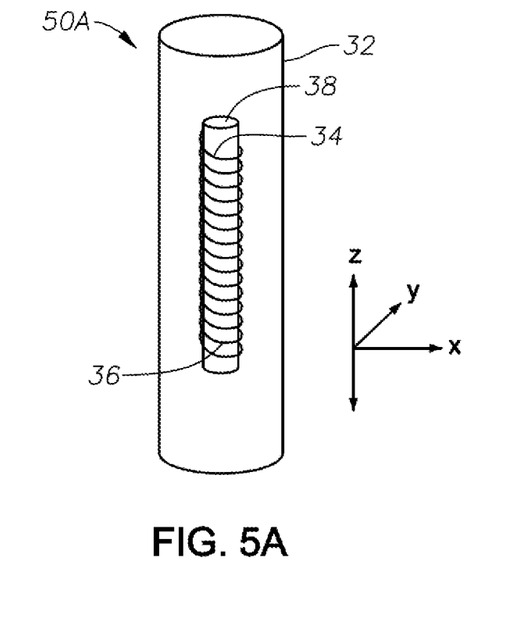
FIGS. 5A, 5B and 5C show alternative embodiments of transmitter-receiver units, according to certain illustrative embodiments of the present disclosure.
Figure 5B:
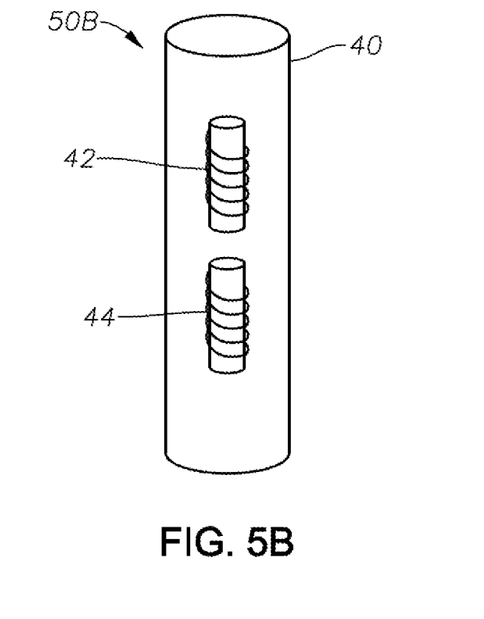

FIGS. 5A and 5B show alternative embodiments of transmitter-receiver units, according to certain illustrative embodiments of the present disclosure. In FIG. 5A, transmitter-receiver unit 50A is designed for TD use, while transmitter-receiver unit 50B is designed for FD use. Transmitter-receiver unit 50A includes a body 32 that may be made of, for example, non-magnetic material. Inside body 32 is a transmitter coil 34 and receiver coil 36 both co-located and wound around the length of magnetic core material 38, thus forming a transceiver. In the case of the TD design of transmitter-receiver unit 50A, the length in time of the decay curve can be adjusted for use with tubulars of different thickness or alloy pipes. In certain illustrative embodiments, this is accomplished by using a preset with low pulse durations (e.g., 0.1-1000 ms) for thin (e.g., 0-0.4") pipes, and a preset with high pulse durations (e.g., 100-10000 ms) for thicker (e.g., 0.3"-2") pipes. Moreover, in certain embodiments, receiver 36 has a length along the borehole axis direction Z that is at least two times longer than the length in the two perpendicular (X,Y) directions in relation to the borehole axis. Such a design enables the measurement of a strong secondary electromagnetic signal from the cable because relative contribution of secondary fields from the cable increase with the length of the receiver compared to the contribution from the pipe itself. This increases the relative sensitivity to the cable, while minimizing the sensitivity to the pipe. This is essential to detect a cable, which has a lower metal content in volume, compared to a pipe, which has a much higher metal content in volume.

In the case of the FD design of transmitter-receiver unit 50B the frequencies used can be adjusted for use with tubulars of different thickness or for alloy pipes. As a result, the ratio of the received secondary signal due to the cable, as compared to the primary direct signal, is maximized. Frequency at which the maximum is observed can be determined from electromagnetic computer models of the pipe, cable and the tool. In this embodiment, again a body 40 houses a transmitter coil 42 and receiver coil 44, each wound around a magnetic core and axially separated from one another at a distance of, for example, 6 to 100 inches. The axial separation provides maximization of the sensitivity to cable relative to sensitivity to tubular 10, similar to the length adjustment for TD. In addition, in this example, transmitter coil 42 and receiver coil 44 are located along the same axis.

Figure 5C:
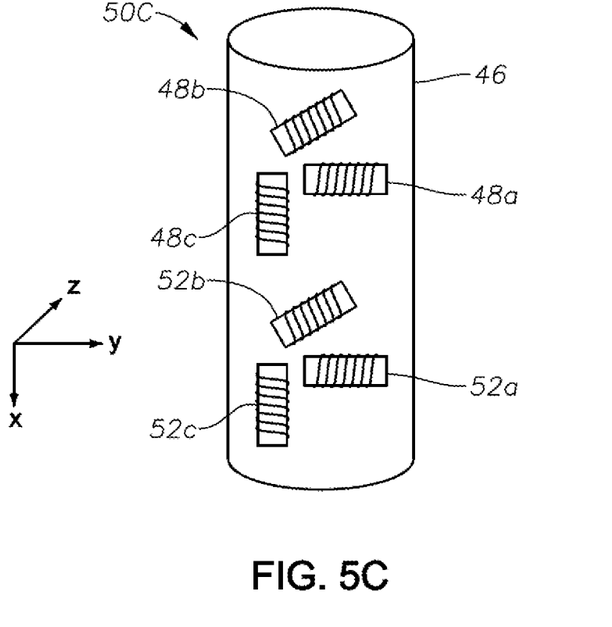

In certain other illustrative embodiments, the transmitter-receiver units described herein may include more than one transmitter and more than one receiver. Moreover, the transmitter and receiver coils may or may not be located along the same axis. FIG. 5C shows yet another alternative embodiment of a transmitter-receiver unit, according to certain illustrative embodiments of the present disclosure. Here, transmitter-receiver unit 50C includes a non-magnetic body 40 which houses three orthogonal oriented transmitter receiver unit antennas. Three transmitter coils 48a, 48b and 4c are shown oriented in orthogonal relationships to one another, while three receiver coils 52a, 52b and 52c are shown in orthogonal relationship to one another. Moreover, transmitter coils 48a-c and receiver coils 52a-c are axial separated from one another, as previously described. Such a design provides the advantage of providing diverse measurements that are sensitive to cables in any direction with the least cross-sectional area for the sensor possible. These and other variations will be apparent to those ordinarily skilled in the art having the benefit of this disclosure.

Figure 6A:
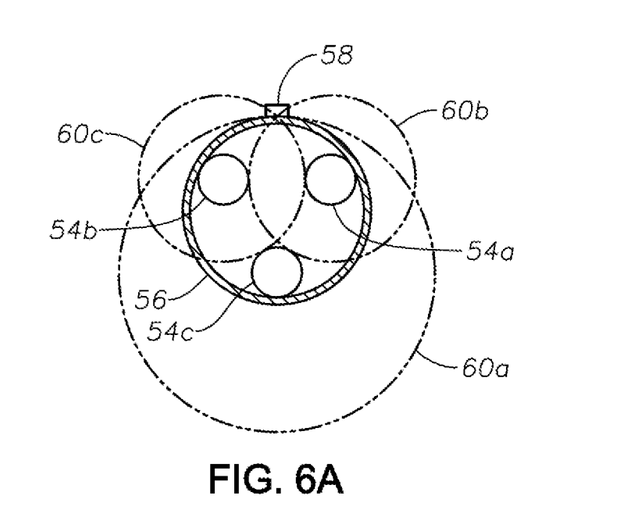
FIG. 6A is a cross-sectional view of a tubular having an interrogation tool positioned therein, according to certain illustrative embodiments of the present disclosure.

FIG. 6A is a cross-sectional view of a tubular having an interrogation tool positioned therein, according to certain illustrative embodiments of the present disclosure. FIG. 6A is useful to explain the fundamental concept of methods used to detect the position of a cable using the vertical transmitter-receiver unit design described herein. Here, three transmitter-receiver units 54a-c are illustrated (note that the body of the interrogation tool is not shown for simplicity). The design of transmitter-receiver units 54a-c may be any of those described herein. The transmitter-receiver units 54a-c are positioned inside a tubular 56 having a cable 58 located there-around.

During operation, a transmitter (located in transmitter-receiver units 54a-c or in the body of the interrogation tool) emits an electromagnetic field inside tubular 56. The emitted electromagnetic field interacts with the body of tubular 56 and cable 58 (metal associated with cable 58) to produce a secondary electromagnetic field detected by the receivers of the azimuthally insensitive transmitter-receiver units 54a-c. The measured secondary electromagnetic fields produce response signals in the transmitter-receiver units. Based on the distance of transmitter-receiver units 54a-c from cable 58, the three response signals yield three possible positions 60a, 60b and 60c for cable 58. As can be seen, since the distance of transmitter-receiver unit 54c is farthest from cable 58, its possible position 60a is the largest. At the same time, the possible positions 60b and 60c of transmitter-receiver units 54a and 54b, respectively, are the same size. As will be described in more detail below, by analyzing the intersection of the three response signals (i.e., their possible positions 60a-c), processing circuitry of the present disclosure determines the unique location of cable 58.

It is important to consider the direction of the expected target (i.e., cable) to determine the ideal orientation of the transmitter-receiver configuration for the transmitter-receiver units. For a typical cable oriented along the axis of the well, placing receiver and transmitters solenoids along the same axis is most convenient, as shown in FIGS. 5A and 5B. Sensors with other orientations, such as those in FIG. 5C, can help when the geometry of the cable includes section where the cable raps around the pipe in a helical/spiral fashion. For the most common problem of finding the position of the cable to avoid damage by exploding perforations charges, the sensors along the axis of the well is sufficient. In certain alternative embodiments, however, to provide a higher resolution in the case of the FD approach with transmitter and receiver separated by an axial distance, the receiver can be bucked, which helps increase the sensitivity to ferromagnetic anomalies in the tubular.

Above, it was mentioned that, in certain embodiments, two measurements of the secondary electromagnetic field from different angular positions around the tubular could be used if one knows a priori the side of the tubular the cable is on. These two measurements may be obtained using two transmitter-receiver units or a single transmitter-receiver unit that is rotated around the tubular. Here, if the tubular were split into two 180 degree sides, one would need to know which side the cable was located on. With this prior knowledge, the unique location of the cable can be determined using two response signals. To obtain the cable position using this method, first the ratio of signals from the first and second receiver is calculated. Then, this ratio is compared to a modeled ratio from a forward model with the cable at an azimuthal angle. The angle is adjusted until the ratio matches the modeled ratio. An electromagnetic simulation method such as, for example, finite difference, finite element, method of moments, integral equations or semi analytical formulations may be used as the forward model. This iterative process is called inversion. During the inversion, the precomputed database may replace the forward model. In alternative methods, however, forward modeling can also be used, although in that case the inversion would be much slower because the solution of the generic problem with the cable outside the tubular takes more time to compute than it takes to read the result from a database.

Figure 6B:
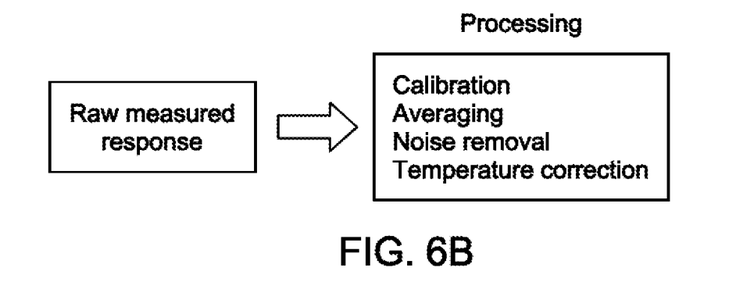
FIG. 6B is a block diagram of alternative processing approaches, according to various alternative methods of the present disclosure.

Prior to applying the inversion, the data can be processed with operations, such as, for example, calibration, averaging and filtering to remove noise. In yet other illustrative methods, the response data may also be corrected for temperature effects. FIG. 6B is a block diagram of alternative processing approaches, according to various alternative methods of the present disclosure.

Figure 6C:
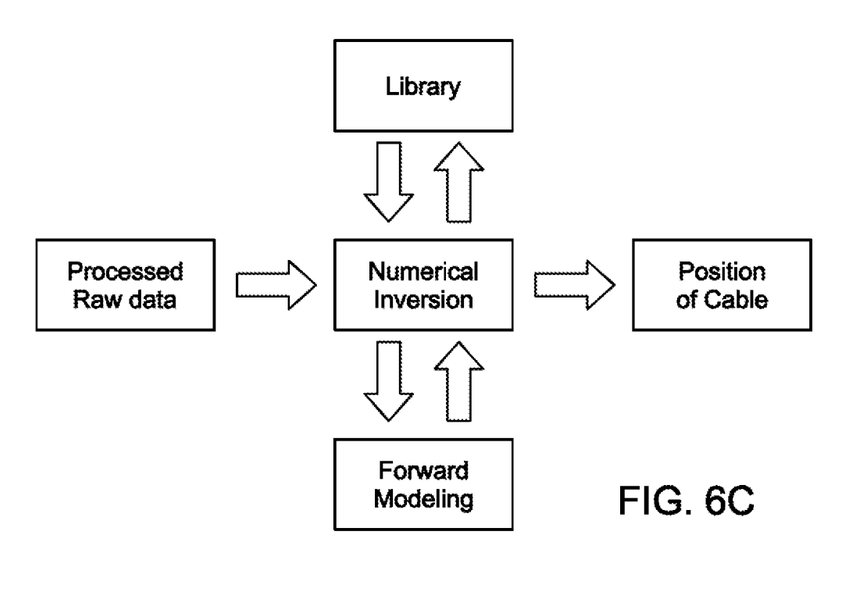
FIG. 6C is a block diagram of an illustrative inversion scheme, according to certain illustrative methods of the present disclosure.

FIG. 6C is a block diagram of an illustrative inversion scheme, according to certain illustrative methods of the present disclosure. The illustrative inversion scheme consists of the operations required to convert the measured response signals to a position of the cable that best matches the measured data. In certain methods, the inversion scheme performed by processing circuitry is as follows: First, the measured response signals are compared to precomputed baseline response signals from a library or a forward modeling code. In practice, baseline response signals from the library or forward modeling could be used (or even both used). In cases where the library does not cover all cases, it may be supplemented by the forward modeling to improve the results. Nevertheless, an iterative numerical optimization problem is then solved based on the difference between the baseline signals and the measured response signals. The numerical problem is based upon the numerical model of the tubular and cable constructed for forward modeling and construction of the database.

Figure 7A:
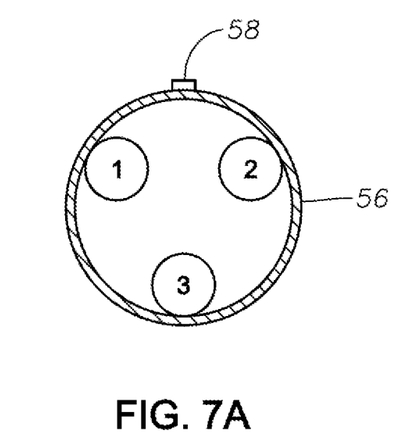
FIGS. 7A-7C illustrate one illustrative calibration routine for the interrogation tools of the present disclosure.
Figure 7B:
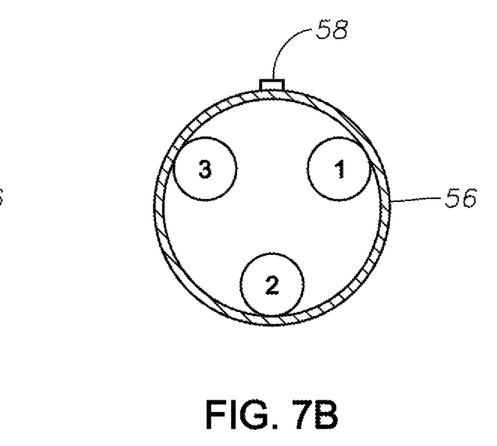
Figure 7C:
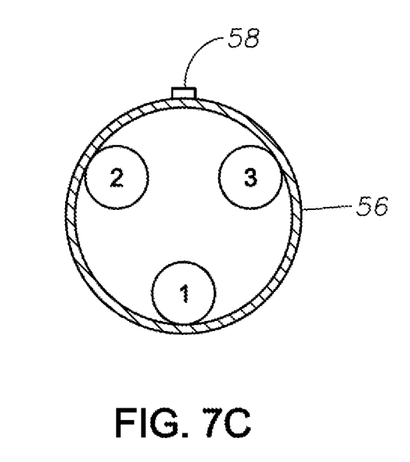

Before operation of certain illustrative embodiments of the present disclosure, the interrogation tools may be calibrated. The calibration method may be performed to ensure the responses of the three transmitter-receiver units are balanced, i.e. have equal responses to the same metal disturbance. FIGS. 7A-7C illustrate one illustrative calibration routine for the interrogation tools of the present disclosure. Here, the interrogation tool (without the body) is shown inside tubular 56 having a cable 58 positioned around its outer surface. The interrogation tool includes transmitter-receiver units 1, 2 and 3 (which may include transmitters therein or the transmitter may be positioned in the body).

To perform the calibration, the interrogation tool is rotated from the position in FIG. 7A by 120 degrees to the position shown in FIG. 7B, and another 120 degrees to the position shown in FIG. 7C. This illustrative calibration position consists of applying factors to the so that the electromagnetic measurements of the three transmitter-receiver units 1-3 are equal to each other at equal positions. As will be understood by those ordinarily skilled in the art having the benefit of this disclosure, the factors are variables used to cancel variances in the response signals. Such factors may include, for example, multiplative complex or real valued number for each transmitter-receiver unit 62. Ultimately, the calibration procedure ensures that the transmitter-receiver units 1-3 are balanced because the identification of the metal disturbance position due to the presence of the cable is detected by evaluating the differences in the responses of the three transmitter-receiver units 1-3.

Figure 8:
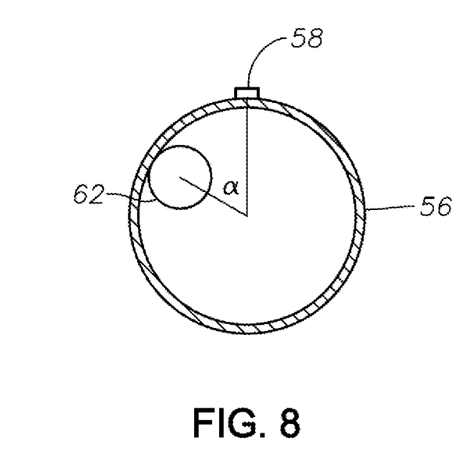
FIG. 8 again shows a sectional view of the tubular having an interrogation tool therein.

After the secondary electromagnetic field is measured, the resulting response signals are processed by circuitry onboard the interrogation tool (or remote therefrom). In certain illustrative methods, the response data is processed to determine the position of the cable consistent with the measurements. For this purpose, in certain methods, a database is constructed with the solution of the generic problem of a vertical metal piece behind casing for any angle between the transmitter-receiver unit and the position of the cable, as indicated in FIG. 8. FIG. 8 again shows a sectional view of the tubular having an interrogation tool therein. In FIG. 8, a single transmitter-receiver unit 62 is shown at an angular position a with respect to the position of cable 58, whereby the position a is the angular difference between transmitter-receiver unit 62 and the cable 58.

According to this illustrative processing scheme, the generic problem is solved to generate a database of numerical solutions used in the inversion of the interrogation tool data. The angle α can vary in the range [0, 180] degrees. In certain illustrative methods, the solution could be precomputed for cases separated by 1 degree, for example.

Figure 9A:
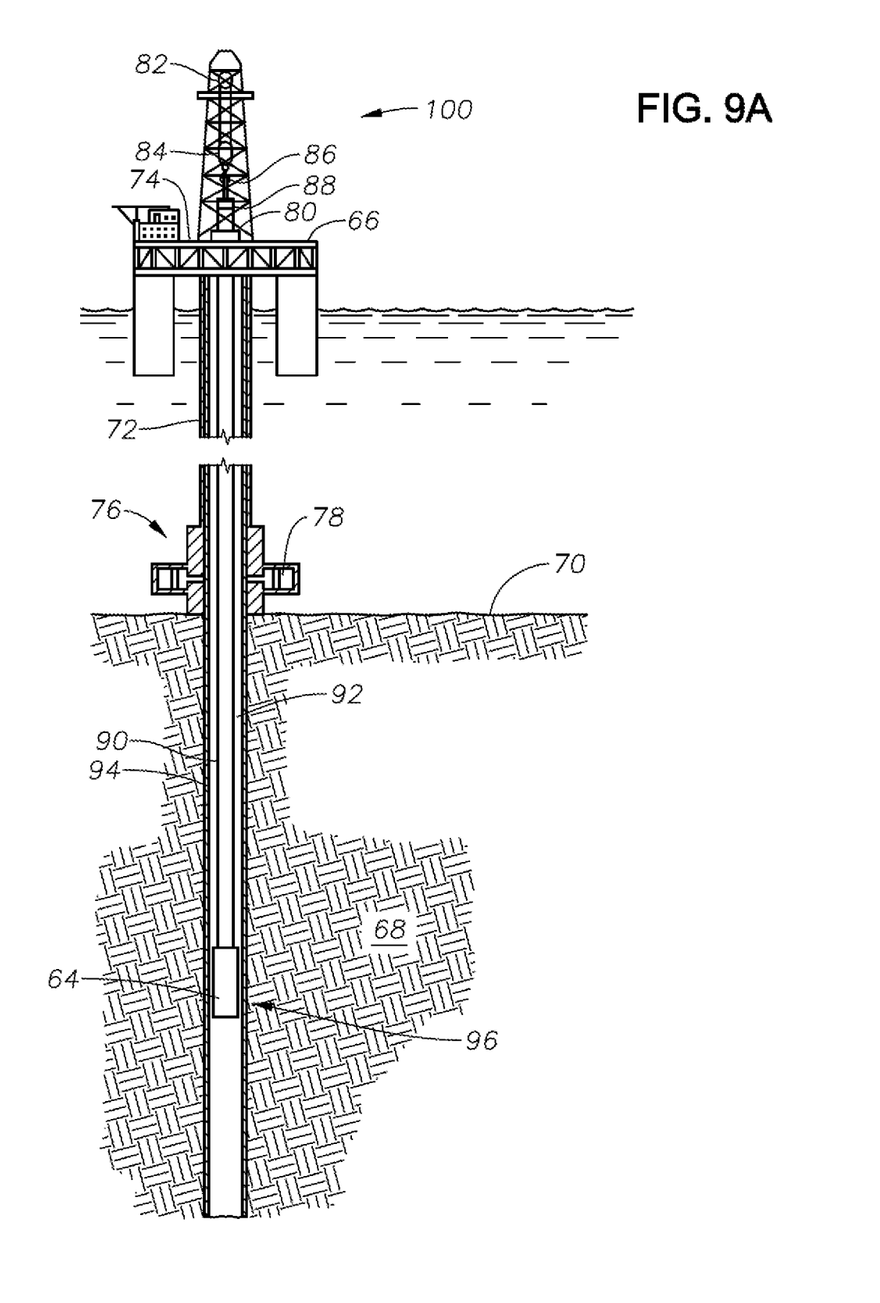
FIGS. 9A and 9B illustrate an interrogation tool deployed along an offshore oil and gas platform, according to certain illustrative embodiments of the present disclosure.

The illustrative interrogation tools and methods described herein may be deployed in a variety of ways. For example, the interrogation tools may be deployed along a logging assembly (e.g., logging-while-drilling, measurement-while-drilling, wireline assembly, etc.) or perforation assembly. FIG. 9A illustrates one such deployment, an offshore oil and gas platform generally designated 100, operably coupled by way of example to an interrogation tool 64 as described herein. Such an assembly could alternatively be coupled to a semi-sub or a drill ship as well. Also, even though FIG. 9A depicts an offshore operation, it should be understood by those ordinarily skilled in the art having the benefit of this disclosure that embodiments described herein are equally well suited for use in onshore operations. By way of convention in the following discussion, though FIG. 9A depicts a vertical wellbore, it will be understood by those same skilled persons that the embodiments are equally well suited for use in wellbores having other orientations including, for example, horizontal wellbores, slanted wellbores, multilateral wellbores or the like.

Referring still to the offshore oil and gas platform example of FIG. 9A, a semi-submersible platform 66 may be positioned over a submerged oil and gas formation 68 located below a sea floor 70. A subsea conduit 72 may extend from a deck 74 of the platform 66 to a subsea wellhead installation 76, including blowout preventers 78. The platform 66 may have a hoisting apparatus 80, a derrick 82, a travel block 84, a hook 86, and a swivel 88 for raising and lowering pipe strings, such as a substantially tubular, axially extending tubing string 90.

As in the present example embodiment of FIG. 9A, a wellbore 92 extends through the various earth strata including the formation 68, with a portion of wellbore 92 having a casing string 94 cemented therein. Although not shown, casing string 94 has a cable positioned along its outer surface. Disposed in wellbore 92 is a completion assembly 96. Generally, assembly 96 may be any one or more completion assemblies, such as for example a hydraulic fracturing assembly, a gravel packing assembly, etc. In this embodiment, completion assembly 96 also includes an interrogation tool 64 as described herein, along with a perforation tool (not shown). The assembly 96 is coupled to the tubing string 90 extending along casing string 94 which has the cable positioned outside. Before perforation operations can begin, the location of the cable behind the casing must be determined. Therefore, as interrogation tool 64 is deployed downhole, the position of the cable is determined at as many depths as desired.

Figure 10:
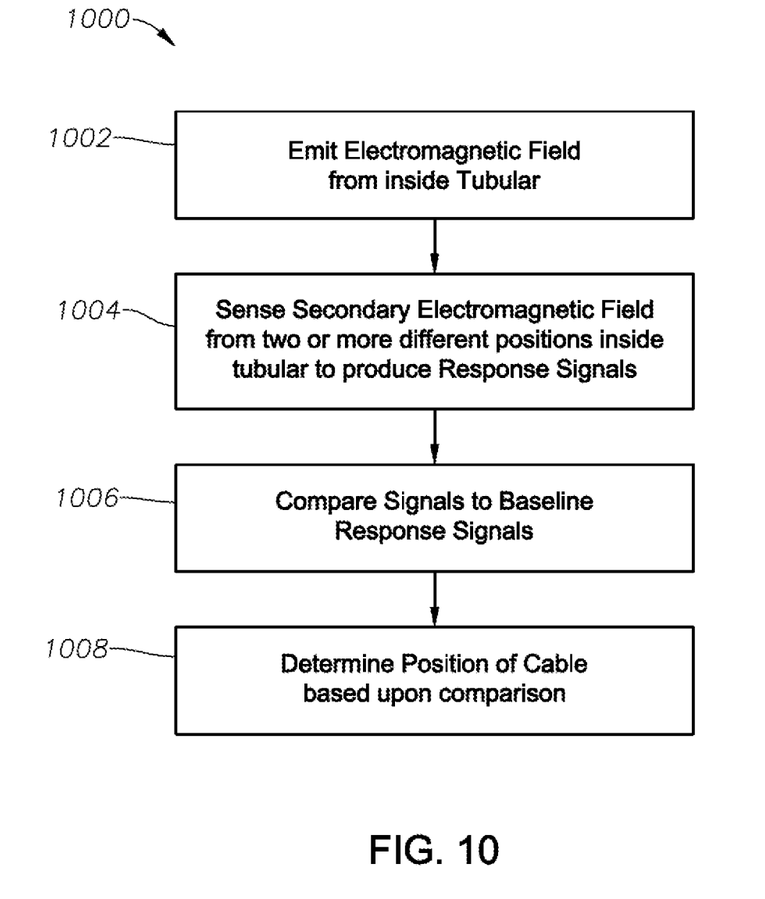
FIG. 10 is a flow chart of a method to determine the location of cable behind a tubular, according to certain illustrative methods of the present disclosure.

FIG. 10 is a flow chart of a method to determine the location of cable behind a tubular, according to certain illustrative methods of the present disclosure. With reference to FIGS. 9A and 10, in method 1000, the transmitter of interrogation tool 64 emits an electromagnetic field from inside casing string 94 which interacts with casing string 94 and the metal disruptions caused by the cable to produce a secondary electromagnetic field (via induced eddy currents), at block 1002.

At block 1004, the secondary electromagnetic field is then sensed/measured by one or more receivers of interrogation tool 64 to thereby produce response signals. In certain methods, two receivers are used to obtain the measurements, while in other methods a single receiver is used. Regardless of the number of receivers used, the secondary electromagnetic field is measured at two or more different positions inside casing string 94. At block 1006, processing circuitry onboard interrogation tool 64 or located remotely (at the surface, for example) then compares the response signals to baseline response signals, as described herein, whereby the position of the cable behind casing string 94 is determined at block 1008. In certain methods, the baseline response signals are provided from a precomputed baseline signal library or a forward modeling code.

The secondary electromagnetic field may be measured using a variety of illustrative interrogation tools 64. In addition to those already described, interrogation tool 64 may include a single transmitter-receiver unit that rotates around the inner diameter of casing string 94 to produce the two or more response signals. In this method, the measurements would be taken sequentially. In other methods, the interrogation tool includes two or more transmitter-receiver units positioned there around which produce the response signals. In such embodiments, the two or more secondary electromagnetic field measurements may be obtained simultaneously or sequentially, and corresponding response signal generated accordingly. However, alternatively, the two or more measurements may be obtained sequentially. Nevertheless, although any number of response signals may be obtained, in any of the embodiments described therein, the position of the cable may be determined using only two or three response signals obtained at different positions (i.e., angular orientations) around the tubular.

Figure 9B:
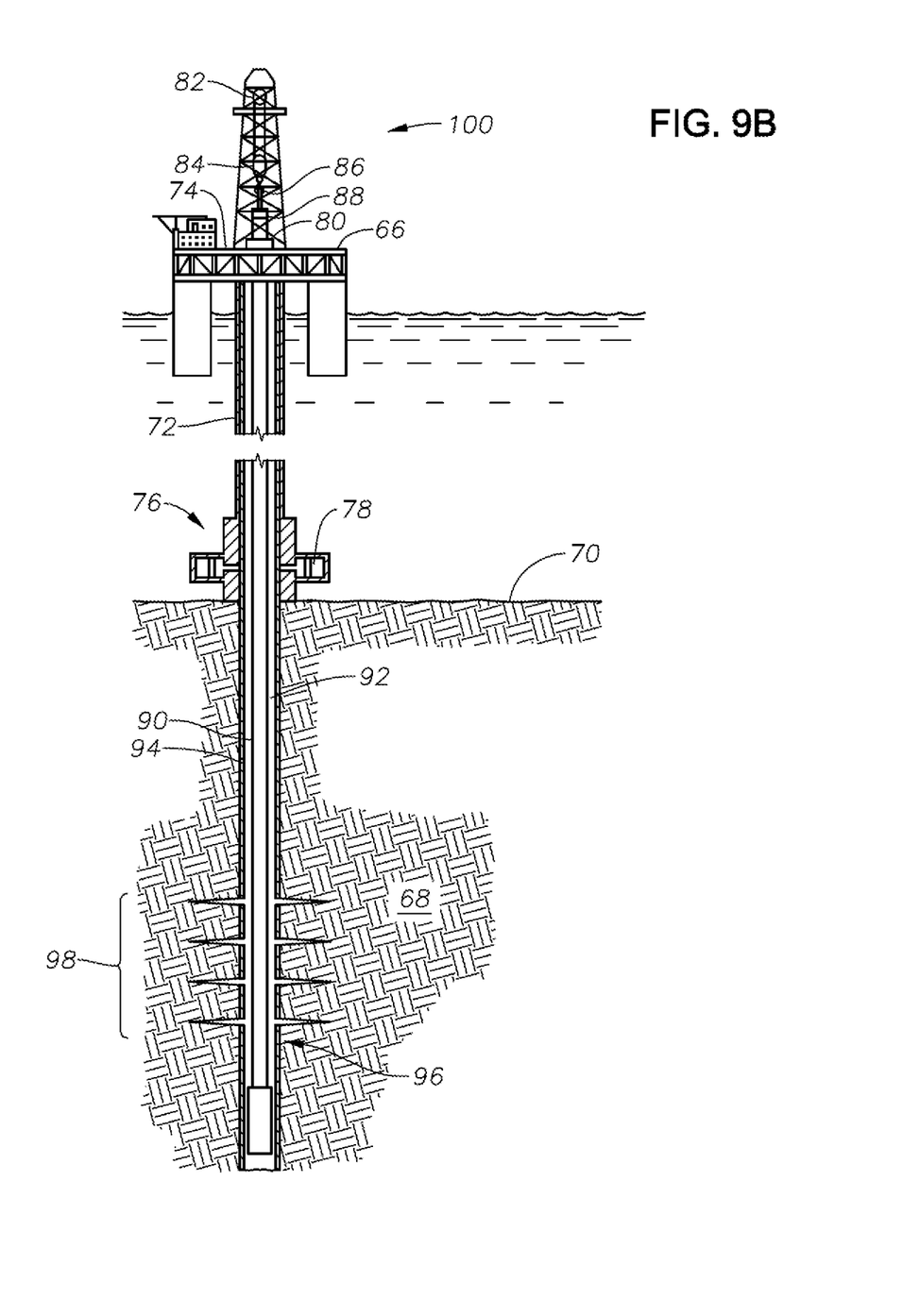

Nevertheless, with reference back to FIG. 9A, after the location of the cable behind casing string 94 is determined, casing string 94 is ready to be perforated while avoiding damage to the cable. FIG. 9B is similar to FIG. 9A, as like elements refer to like elements; however, as shown, perforations 98 have been created at angular positions around casing string 94 where the cable is not located. Accordingly, the cable sustains no damage.

Figure 9C:
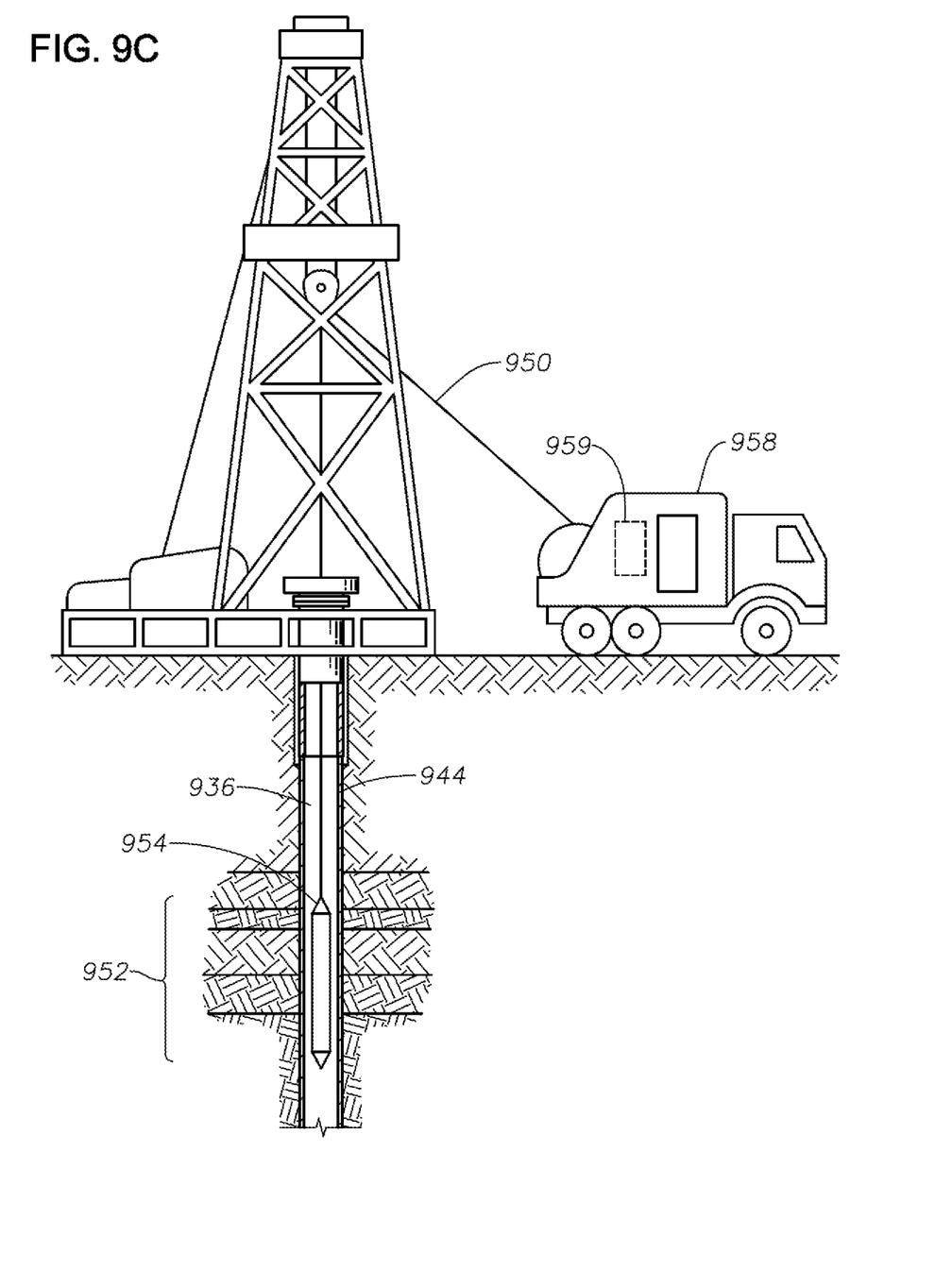
FIG. 9C illustrates an interrogation tool deployed along a wireline string, accordingly to certain illustrative embodiments of the present disclosure.

FIG. 9C illustrates an interrogation tool deployed along a wireline to determine the position of a cable, according to illustrative embodiments of the present disclosure. As shown in FIG. 9C, a wireline tool string 952 (e.g., a cable interrogation tool) as described herein can be lowered into wellbore 936 by a cable 950 to detect the position of a cable (not shown) behind casing 944. In some embodiments, cable 950 includes conductors and/or optical fibers for transporting power to wireline tool string 952 and data/communications from wireline tool string 952 to the surface. It should be noted that various types of formation property sensors can be included with wireline tool string 952. In accordance with the disclosed cable position detection techniques, the illustrative wireline tool string 952 includes logging sonde 954 with the necessary transmitters/receivers and processing circuitry to determine the position of the cable behind casing 944. Alternatively, however, the response signals may be communicated uphole to a processing facility 958 (e.g, wireline logging facility) whereby the cable position is determined using computing facility 959. Thereafter, wireline tool string 952 may be withdrawn from wellbore 936 and a perforation assembly, for example, may be deployed.

The illustrative interrogation tools described herein include processing circuitry to perform the methods described herein. However, in alternative embodiments, the processing circuitry may be remotely located from the interrogation tools, whereby data communication is enabled using any variety of telemetry or other communications techniques. Nevertheless, the processing circuitry may include at least one processor, along with a non-transitory, computer-readable memory, transceiver/network communication module, optional I/O devices, and an optional display (e.g., user interface), all interconnected via a system bus. Software instructions executable by the processor for implementing the functions of the illustrative methods described herein may be stored in the memory.

The processing circuitry may be connected to one or more public and/or private networks via one or more appropriate network connections. It will also be recognized that the software instructions to perform the functions of the present disclosure may also be loaded into local memory from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

The proposed embodiments and methods greatly reduce the time required to determine the position of the cable outside the tubular (e.g., casing), so that perforation charges can be placed without risk of damaging the cable. The proposed interrogation tools and methods could log at three ft/min, which reduces the assessment time (when compared to conventional techniques) by a factor of 100. Moreover, embodiments of the present disclosure may also be used to search for cable behind tubulars of multiple diameters.

Embodiments and methods of the present disclosure described herein further relate to any one or more of the following paragraphs:

1. A downhole method to determine a position of a cable, comprising emitting an electromagnetic field using a transmitter positioned inside a tubular, the tubular having a cable positioned outside the tubular, wherein the electromagnetic field interacts with the tubular to produce a secondary electromagnetic field; sensing the secondary electromagnetic field using a first receiver positioned inside the tubular to thereby generate a first response signal; sensing the secondary electromagnetic field using a second receiver positioned inside the tubular to thereby generate a second response signal; comparing the first and second response signals to a baseline response signal; and determining a position of the cable based upon the comparison.

2. A downhole method as defined in paragraph 1, wherein comparing the first and second response signals to the baseline response signal comprises comparing the first and second response signals to a baseline response signal of a pre-computed baseline response signal library.

3. A downhole method as defined in paragraphs 1 or 2, wherein comparing the first and second response signals to the baseline response signal comprises comparing the first and second response signals to a baseline response signal of a forward modeling code.

4. A downhole method as defined in any of paragraphs 1-3, wherein comparing the first and second response signals to the baseline response signal comprises determining a difference between the first and second response signals and the baseline response signal; and solving an iterative optimization problem based on the difference.

5. A downhole method as defined in any of paragraphs 1-4, wherein determining the position of the cable further comprises determining a side of the tubular at which the cable is positioned before the first and second response signals are generated; and determining the position of the cable based upon the first response signal, second response signal, and the determined side at which the cable is positioned.

6. A downhole method as defined in any of paragraphs 1-5, further comprising sensing the secondary electromagnetic field using a third receiver positioned inside the tubular to thereby generate a third response signal; comparing the first, second and third response signals to the baseline response signal; and determining a position of the cable based upon the comparison.

7. A downhole method as defined in any of paragraphs 1-6, wherein the first and second receivers simultaneously sense the secondary electromagnetic field.

8. A downhole method as defined in any of paragraphs 1-7, wherein the first, second and third receivers simultaneously sense the secondary electromagnetic field.

9. A downhole method as defined in any of paragraphs 1-8, wherein the first and second receivers sequentially sense the secondary electromagnetic field.

10. A downhole method as defined in any of paragraphs 1-9, wherein the first, second and third receivers sequentially sense the secondary electromagnetic field.

11. A downhole method as defined in any of paragraphs 1-10, wherein the tubular is a casing string; and the method further comprises using the position of the cable to determine where to place perforations in the casing string; and perforating the casing string.

12. A downhole method as defined in any of paragraphs 1-11, wherein the first or second receiver has a length along a borehole axis direction that is at least two times longer than a length in two perpendicular directions in relation to the borehole axis.

13. A downhole method to determine a position of a cable, comprising emitting an electromagnetic field from a position inside a tubular, the tubular having a cable positioned outside the tubular, wherein the electromagnetic field interacts with the tubular to produce a secondary electromagnetic field; sensing the secondary electromagnetic field from at least two different positions inside the tubular to thereby generate response signals; comparing the response signals to baseline response signals; and determining a position of the cable based upon the comparison.

14. A downhole method as defined in paragraph 13, wherein the baseline response signals are provided from a baseline response signal library or a forward modeling code.

15. A downhole method as defined in paragraphs 13 or 14, wherein the secondary electromagnetic field is sensed using a single receiver which rotates around an inner diameter of the tubular to thereby generate at least a first and second response signal.

16. A downhole method as defined in any of paragraphs 13-15, wherein the secondary electromagnetic field is sensed using a two or more receivers positioned at different angular orientations around an inner diameter of the tubular to thereby generate two or more response signals.

17. A downhole method as defined in any of paragraphs 13-16, wherein sensing the secondary electromagnetic field comprises extending the two or more receivers outwardly toward a wall of the tubular.

18. A downhole method as defined in any of paragraphs 13-17, wherein determining the position of the cable comprises using an inversion technique.

19. A downhole method as defined in any of paragraphs 13-18, wherein the secondary electromagnetic fields are simultaneously sensed at the at least two different positions.

20. A downhole method as defined in any of paragraphs 13-19, wherein the secondary electromagnetic fields are sequentially sensed at the at least two different positions.

21. A downhole method as defined in any of paragraphs 13-20, wherein the tubular is a casing string; and the method further comprises perforating the casing string based upon the determined position of the cable.

22. A downhole method as defined in any of paragraphs 13-21, wherein the electromagnetic field is emitted using a transmitter positioned at a center of a tool; and the secondary electromagnetic field is sensed using a stationary or moveable receiver of the tool.

23. A downhole method as defined in any of paragraphs 13-22, wherein the receiver used to sense the secondary electromagnetic field has a length along a borehole axis direction that is at least two times longer than a length in two perpendicular directions in relation to the borehole axis.

Furthermore, the illustrative methods described herein may be implemented by a system comprising processing circuitry or a non-transitory computer readable medium comprising instructions which, when executed by at least one processor, causes the processor to perform any of the methods described herein.

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the illustrative term "below" can encompass both an orientation of above and below. The apparatus may be otherwise oriented (rotated 90 degrees or at other orientations) and the spatially relative descriptors used herein may likewise be interpreted accordingly.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A downhole method to determine a position of a cable, comprising:
emitting an electromagnetic field using a transmitter positioned inside a tubular, the tubular having a cable positioned outside the tubular, wherein the electromagnetic field interacts with the tubular to produce a secondary electromagnetic field;

sensing the secondary electromagnetic field using a first receiver positioned inside the tubular to thereby generate a first response signal;

sensing the secondary electromagnetic field using a second receiver positioned inside the tubular to thereby generate a second response signal;

comparing the first and second response signals to a baseline response signal; and determining a unique position of the cable at a respective measurement depth based upon the comparison.

2. A downhole method as defined in claim 1, wherein comparing the first and second response signals to the baseline response signal comprises comparing the first and second response signals to a baseline response signal of a pre-computed baseline response signal library.

3. A downhole method as defined in claim 1, wherein comparing the first and second response signals to the baseline response signal comprises comparing the first and second response signals to a computed baseline response signal of a forward modeling code.

4. A downhole method as defined in claim 1, wherein comparing the first and second response signals to the baseline response signal comprises:

determining a difference between the first and second response signals and the baseline response signal; and computing an optimized inversion based on the difference.

5. A downhole method as defined in claim 1, wherein determining the position of the cable further comprises:

determining a side of the tubular at which the cable is positioned before the first and second response signals are generated; and determining an azimuthal angular position of the cable relative to the side of the tubular the cable positioned based upon the first response signal, second response signal, and the determined side at which the cable is positioned.

6. A downhole method as defined in claim 1, further comprising:

sensing the secondary electromagnetic field using a third receiver positioned inside the tubular to thereby generate a third response signal;

comparing the first, second and third response signals to the baseline response signal; and determining a position of the cable based upon the comparison.

7. A downhole method as defined in claim 6, wherein the first, second and third receivers simultaneously sense the secondary electromagnetic field.

8. A downhole method as defined in claim 6, wherein the first, second and third receivers sequentially sense the secondary electromagnetic field.

9. A downhole method as defined in claim 1, wherein the first and second receivers simultaneously sense the secondary electromagnetic field.

10. A downhole method as defined in claim 1, wherein the first and second receivers sequentially sense the secondary electromagnetic field.

11. A downhole method as defined in claim 1, wherein:
the tubular is a casing string; and
the method further comprises:
using the position of the cable to determine where to place perforations in the casing string; and
perforating the casing string.

12. A downhole method as defined in claim 1, wherein the first or second receiver has a length along a borehole axis direction that is at least two times longer than a length in two perpendicular directions in relation to the borehole axis.

13. A downhole method to determine a position of a cable, comprising:

emitting an electromagnetic field from a position inside a tubular, the tubular having a cable positioned outside the tubular, wherein the electromagnetic field interacts with the tubular to produce a secondary electromagnetic field;

sensing the secondary electromagnetic field from at least two different positions inside the tubular to thereby generate response signals;

comparing the response signals to baseline response signals; and determining a unique position of the cable at a respective measurement depth based upon the comparison.

14. A downhole method as defined in claim 13, wherein the baseline response signals are provided from a baseline response signal library or a forward modeling code.

15. A downhole method as defined in claim 13, wherein the secondary electromagnetic field is sensed using a single receiver which rotates around an inner diameter of the tubular to thereby generate at least a first and second response signal.

16. A downhole method as defined in claim 13, wherein the secondary electromagnetic field is sensed using the two or more receivers positioned at different angular orientations around an inner diameter of the tubular to thereby generate two or more response signals.

17. A downhole method as defined in claim 16, wherein sensing the secondary electromagnetic field comprises extending the two or more receivers outwardly toward a wall of the tubular.

18. A downhole method as defined in claim 13, wherein determining the position of the cable comprises computing an inversion using an inversion technique.

19. A downhole method as defined in claim 13, wherein the secondary electromagnetic fields are simultaneously sensed at the at least two different positions.

20. A downhole method as defined in claim 13, wherein the secondary electromagnetic fields are sequentially sensed at the at least two different positions.

21. A downhole method as defined in claim 13, wherein:
the tubular is a casing string; and
the method further comprises perforating the casing string based upon the determined position of the cable.

22. A downhole method as defined in claim 13, wherein:
the electromagnetic field is emitted using a transmitter positioned at a center of a tool; and
the secondary electromagnetic field is sensed using a stationary or moveable receiver of the tool.

23. A downhole method as defined in claim 22, wherein the receiver used to sense the secondary electromagnetic field has a length along a borehole axis direction that is at least two times longer than a length in two perpendicular directions in relation to the borehole axis.

* * * * *